United States Patent
Hwang

(10) Patent No.: US 11,727,094 B2
(45) Date of Patent: Aug. 15, 2023

(54) MOBILE DEVICE, USER AUTHENTICATION METHOD AND USER AUTHENTICATION SYSTEM OF MOBILE DEVICE

(71) Applicant: SAMSUNG ELECTRONICS CO., LTD., Suwon-si (KR)

(72) Inventor: Jin-ha Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 16/465,775

(22) PCT Filed: Dec. 20, 2017

(86) PCT No.: PCT/KR2017/015083
§ 371 (c)(1),
(2) Date: May 31, 2019

(87) PCT Pub. No.: WO2018/117624
PCT Pub. Date: Jun. 28, 2018

(65) Prior Publication Data
US 2019/0318071 A1    Oct. 17, 2019

(30) Foreign Application Priority Data

Dec. 20, 2016  (KR) .......................... 10-2016-0174777

(51) Int. Cl.
*H04L 29/06*       (2006.01)
*G06F 21/31*       (2013.01)
(Continued)

(52) U.S. Cl.
CPC ........... *G06F 21/31* (2013.01); *H04B 1/3827* (2013.01); *H04L 63/0876* (2013.01); *H04W 12/06* (2013.01)

(58) Field of Classification Search
CPC .. G06F 2221/2141; G06F 21/30; G06F 21/31; G06F 21/32; G06F 21/335;
(Continued)

(56) References Cited

U.S. PATENT DOCUMENTS 9,075,979 B1   7/2015  Queru
9,178,889 B2   11/2015 Metral
(Continued)

FOREIGN PATENT DOCUMENTS

KR    10-2003-0034061 A    5/2003
KR       10-0661314 B1    12/2006
(Continued)

OTHER PUBLICATIONS

Santoso et al., Securing IoT for Smart Home System, Jun. 26, 2015, IEEE, pp. 1-2. (Year: 2015).*
(Continued)

*Primary Examiner* — Luu T Pham
*Assistant Examiner* — Jenise E Jackson
(74) *Attorney, Agent, or Firm* — Sughrue Mion, PLLC

(57) ABSTRACT

A mobile device is disclosed. The present mobile device comprises: a display for displaying an authentication information input screen for receiving user authentication information when the mobile device is connected to a server providing a service requiring input of the user authentication information; a first communication unit for transmitting, to the server, the user authentication information inputted through the authentication information input screen and first simple authentication information generated in the mobile device; a second communication unit for communicating with an electronic device to receive unique information of the electronic device; and a processor for generating second simple authentication information by using unique information of the mobile device and the unique information of the
(Continued)

electronic device, transmitting the second simple authentication information to the server which matches the first simple authentication information to the user authentication information which are matched with each other, and controlling the display to display an authentication result screen provided from the server according to whether or not the first and the second simple authentication information are matched.

18 Claims, 9 Drawing Sheets

(51) Int. Cl.
    *H04B 1/3827*     (2015.01)
    *H04L 9/40*     (2022.01)
    *H04W 12/06*     (2021.01)

(58) Field of Classification Search
    CPC ........ G06F 21/35; G06F 21/44; G06F 21/445; G06F 21/556; H04L 63/10; H04L 63/0853; H04L 63/0861; H04L 63/0869; H04L 63/0876; H04L 63/101; H04L 63/12; H04W 12/06; H04W 12/30; H04W 12/33; H04W 12/50
    USPC .............................................................. 726/7
    See application file for complete search history.

(56) References Cited

U.S. PATENT DOCUMENTS

| | | | |
|---|---|---|---|
| 9,734,307 B2 | 8/2017 | Yi | |
| 2003/0134615 A1* | 7/2003 | Takeuchi | G07F 7/0886 455/411 |
| 2003/0145203 A1* | 7/2003 | Audebert | G06Q 20/341 713/169 |
| 2007/0043945 A1* | 2/2007 | Choi | H04W 12/06 713/168 |
| 2010/0146075 A1* | 6/2010 | Helaine | H04L 65/1069 709/219 |
| 2012/0159599 A1* | 6/2012 | Szoke | G06F 21/35 726/7 |
| 2013/0282283 A1* | 10/2013 | Bondesen | H04W 4/21 701/537 |
| 2014/0370879 A1* | 12/2014 | Redding | H04M 3/42178 455/419 |
| 2015/0281227 A1* | 10/2015 | Fox Ivey | H04L 63/083 713/168 |
| 2015/0327205 A1* | 11/2015 | Lisboa | H04W 12/06 455/411 |
| 2015/0381594 A1* | 12/2015 | Venkatesan | G06F 16/955 726/6 |
| 2016/0055697 A1* | 2/2016 | Raina | G07C 9/00309 340/5.7 |
| 2016/0164855 A1 | 6/2016 | Johansson et al. | |
| 2016/0165442 A1 | 6/2016 | Shi et al. | |
| 2017/0032382 A1* | 2/2017 | Shulman | G06Q 30/0185 |
| 2017/0041083 A1* | 2/2017 | Kwon | H04L 12/12 |
| 2017/0045866 A1* | 2/2017 | Hou | H04W 12/06 |
| 2017/0055146 A1* | 2/2017 | Ko | H04L 63/0492 |
| 2017/0118641 A1* | 4/2017 | Ishibashi | H04L 9/14 |
| 2017/0249794 A1* | 8/2017 | Davis | G07C 9/00857 |
| 2017/0352210 A1* | 12/2017 | Maiwand | G07C 9/00857 |
| 2017/0352214 A1* | 12/2017 | Maiwand | G07C 9/00857 |
| 2018/0160292 A1* | 6/2018 | Chastain | H04W 4/50 |

FOREIGN PATENT DOCUMENTS

| | | |
|---|---|---|
| KR | 10-2013-0058579 A | 6/2013 |
| KR | 10-2013-0064373 A | 6/2013 |
| KR | 10-2014-0139451 A | 12/2014 |
| KR | 10-2015-0015297 A | 2/2015 |
| KR | 10-1576039 B1 | 12/2015 |
| KR | 10-1580425 B1 | 12/2015 |
| KR | 10-1607234 B1 | 3/2016 |
| KR | 10-2016-0037854 A | 4/2016 |
| KR | 10-2016-0140363 A | 12/2016 |

OTHER PUBLICATIONS

Cai et al, Mobile Authentication System Based on National Regulation and NFC Technology, Jun. 16, 2016, IEEE, pp. 590-595. (Year: 2016).*

International Search Report (PCT/ISA/210) dated Apr. 30, 2018 issued by the International Searching Authority in International Application No. PCT/KR2017/015083.

Written Opinion (PCT/ISA/237) dated Apr. 30, 2018 issued by the International Searching Authority in International Application No. PCT/KR2017/015083.

Communication dated Mar. 5, 2023 by the Korean Intellectual Property Office in counterpart Korean Patent Application No. 10-2016-0174777.

* cited by examiner

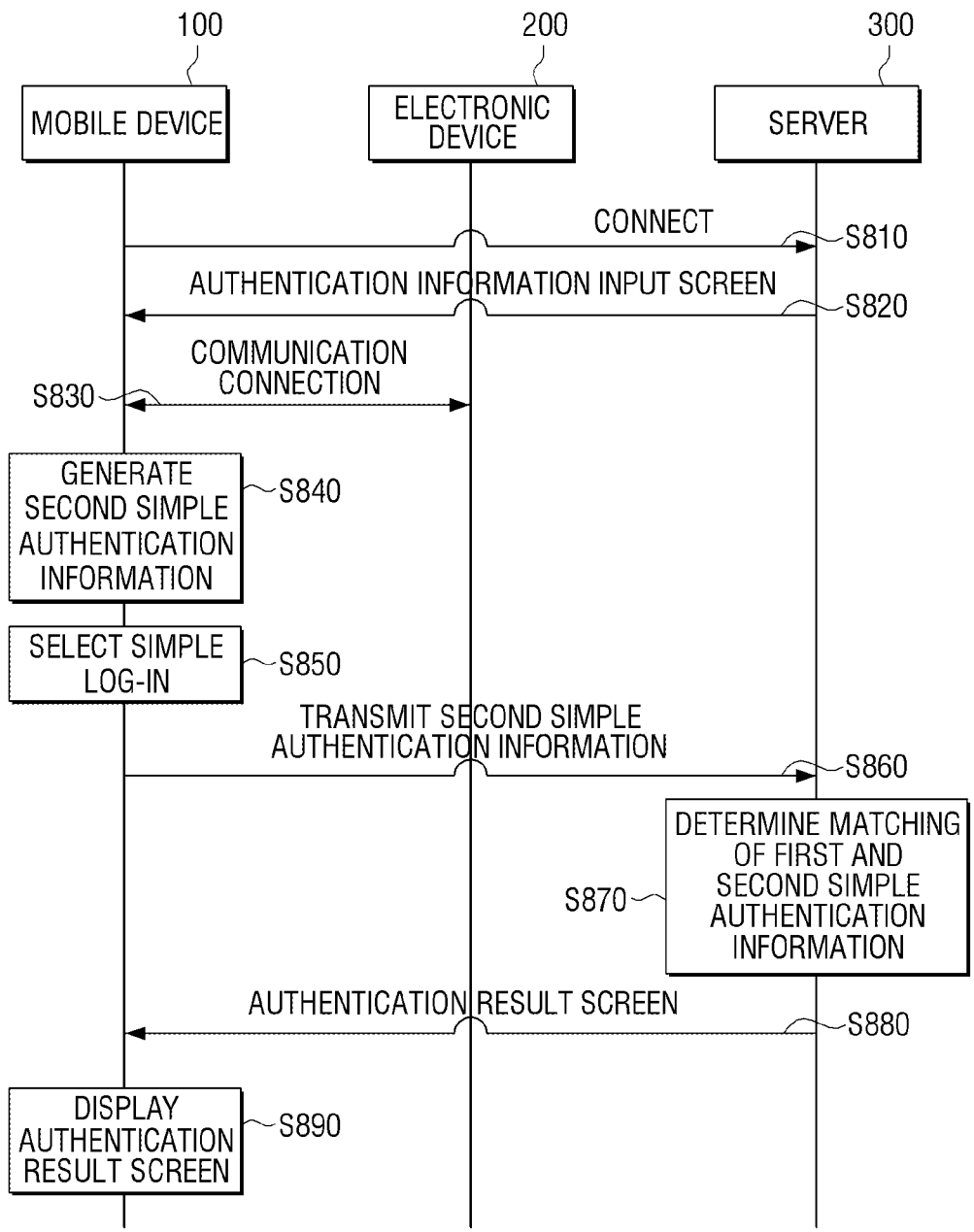

us 11,727,094 B2

MOBILE DEVICE, USER AUTHENTICATION METHOD AND USER AUTHENTICATION SYSTEM OF MOBILE DEVICE

TECHNICAL FIELD

The disclosure relates to a mobile device, a user authentication method of a mobile device, and a user authentication system and, more specifically, to a mobile device capable of authenticating a user conveniently, a user authentication method of a mobile device, and a user authentication system.

BACKGROUND ART

With the development of electronic technology, various wired and wireless network environments exist. Accordingly, a user may be connected to a network through an electronic device for providing or receiving various services.

Among services provided through the network, there is a service which may be used by anyone without any restrictions, but there is also a service which requires an input of various user authentication information such as an identification (ID), a password, a name, a date of birth, a telephone number, or the like. For example, a user who wants to use an e-mail has to log in to the user's account by inputting an ID and a password first, and a user who wants to shop online has to input information such as a name and a telephone number, or the like, for authentication of the user for electronic payment.

As described above, when a user uses various online services requiring input of authentication information, the user has to input authentication information every time, thus feeling inconvenient. In particular, as mobile technology has evolved recently, most services available on a network may be provided through a mobile device, but in using a mobile device, there is the same problem.

In order to solve the problem, a method for allowing automatic access to various sites with a single log-in such as a single sign on (SSO) has been developed, but there is a security problem in that, if log-in information is leaked to another person due to loss of a mobile device, the another person may use the service as well.

DETAILED DESCRIPTION OF THE DISCLOSURE

Technical Objects

The disclosure has been made in order to solve the above-mentioned problems, and the purpose is to provide a mobile device, a user authentication method of a mobile device, and a user authentication system which are capable of solving the inconvenience of a user who has to input authentication information every time whenever the user uses a service requiring input of user authentication information, and preventing the another person from using the services even when the user loses the device, or the authentication information is leaked.

Technical Solving Method

According to an embodiment of the disclosure to achieve the above-described object, a mobile device communicating with a server providing a service requiring input of user authentication information includes a display for, based on the mobile device being connected to a server, displaying an authentication information input screen for receiving the user authentication information, a first communication unit for transmitting, to the server, the user authentication information inputted through the authentication information input screen and first simple authentication information generated in the mobile device, a second communication unit for receiving unique information of the electronic device by communicating with an electronic device; and a processor to generate second simple authentication information by using unique information of the mobile device and the unique information of the electronic device, transmit the second simple authentication information to the server which stores the first simple authentication information and the user authentication information which are matched with each other, and control the display to display an authentication result screen provided from the server according to whether the first and the second simple authentication information are matched.

The processor may, based on a user command for registering simple authentication information being inputted, generate the first simple authentication information using unique information of the mobile device and unique information of the electronic device, and control the first communication unit to transmit the inputted user authentication information and the first simple authentication information to the server.

The server may, based on the user authentication information and the first simple authentication information being received from the mobile device, match the first simple authentication information and the user authentication information and store the matched first simple authentication information and user authentication information.

The second communication unit may perform pairing with the electronic device according to a near-field communication method, and the processor may obtain unique information of the electronic device in the pairing process.

The processor may, based on the mobile device being paired with the electronic device, generate the second simple authentication information, and, based on the mobile device being reconnected to the server, control the first communication unit to transmit the second simple authentication information to the server.

The processor may, based on the mobile device being reconnected to the server, confirm whether the mobile device is paired with the electronic device, based on the mobile device and the electronic device being paired, generate the second simple authentication information, and control the first communication unit to transmit the second simple authentication information to the server.

The processor may, based on pairing of the mobile device and the electronic device being released, delete the second simple authentication information.

The electronic device may be a stationary electronic device which is fixedly arranged on a predetermined position and used.

According to an embodiment, a user authentication method of a mobile device includes, based on the mobile device being connected to a server providing a service requiring input of user authentication information, displaying an authentication information input screen for receiving the user authentication information, transmitting, to the server, the user authentication information inputted through the authentication information input screen and first simple authentication information generated in the mobile device, receiving unique information of the electronic device by communicating with an electronic device, generating second simple authentication information by using unique information of the mobile device and the unique information of the electronic device, transmitting the second simple authentication information to the server which stores the first simple authentication information and the user authentication information which are matched with each other, and displaying an authentication result screen provided from the server according to whether the first and the second simple authentication information are matched.

The transmitting the first simple authentication information to the server may include receiving unique information of the electronic device from the electronic device, based on a user command for registering simple authentication information being inputted, generating the first simple authentication information by using unique information of the mobile device and unique information of the electronic device, and transmitting the inputted user authentication information and the first simple authentication information to the server.

The server may, based on the user authentication information and the first simple authentication information being received from the mobile device, match the first simple authentication information and the user authentication information and store the matched first simple authentication information and user authentication information.

The receiving unique information of the electronic device may include receiving unique information of the electronic device in a process of pairing with the electronic device according to a near-field communication method.

The generating the second simple authentication information may include, based on the mobile device being paired with the electronic device, generating the second simple authentication information, and the transmitting the second simple authentication information may include, based on the mobile device being reconnected to the server, transmitting the second simple authentication information to the server.

The generating the second simple authentication information may include, based on the mobile device being reconnected to the server, confirming whether the mobile device is paired with the electronic device, and based on the mobile device and the electronic device being paired, generating the second simple authentication information.

The method may include, based on pairing of the mobile device and the electronic device being released, deleting the second simple authentication information.

The electronic device may be a stationary electronic device which is fixedly arranged on a predetermined position and used.

According to an embodiment, a user authentication system includes a server providing a service requiring input of user authentication information, an electronic device, and a mobile device to, based on being connected to the server, display an authentication information input screen for receiving the user authentication information, obtain unique information of the electronic device by communicating with the electronic device, generate the first simple authentication information using unique information of the mobile device and unique information of the electronic device, transmit the user authentication information inputted through the authentication information input screen and the first simple authentication information to the server, wherein the mobile device is reconnected to the server, and if unique information of the electronic device is obtained by communicating with the electronic device, the mobile device generate the second simple authentication information using unique information of the mobile device and unique information of the electronic device, transmit the second simple authentication information to the server, and the server matches the first simple authentication information to the user authentication information and stores the information, and provides the authentication result screen to the mobile device according to whether the first and second simple information are matched.

Advantageous Effects

According to various embodiments as described above, inconvenience of a user who has to input authentication information every time when using a service requiring input of the authentication information would be solved, and even when the user loses the device or authentication information of the user is leaked, it is possible to prevent another person from using the service.

BRIEF DESCRIPTION OF THE DRAWINGS

FIG. 8 is a procedure map illustrating a user authentication method of a mobile device in a user authentication system according to an embodiment.

MODE FOR EMBODYING THE INVENTION

In describing the disclosure, a detailed description of the related art is omitted when it is determined that the detailed description may unnecessarily obscure the gist of the disclosure. In addition, the suffix "part" for a component used in the following description is given or used in consideration of the ease of writing the specification, and does not have a distinct meaning or role as it is.

The terminology used herein is used to describe embodiments, and is not intended to restrict and/or limit the disclosure. The singular expressions include plural expressions unless the context clearly dictates otherwise. Further, numerals (for example, first, second, etc.) used in the description process of this specification are merely an identifier for distinguishing one configuration from another.

It is to be understood that the terms such as "comprise" or "consist of" are used herein to designate a presence of characteristic, number, operation, element, component, or a combination thereof, and not to preclude a presence or a possibility of adding one or more of other characteristics, numbers, operations, elements, components or a combination thereof.

Also, in an embodiment, when any part is connected to another part, this includes a direct connection and an indirect connection through another medium. Further, when a certain portion includes a certain element, unless specified to the contrary, this means that another element may be additionally included, rather than precluding another element.

Figure 1:
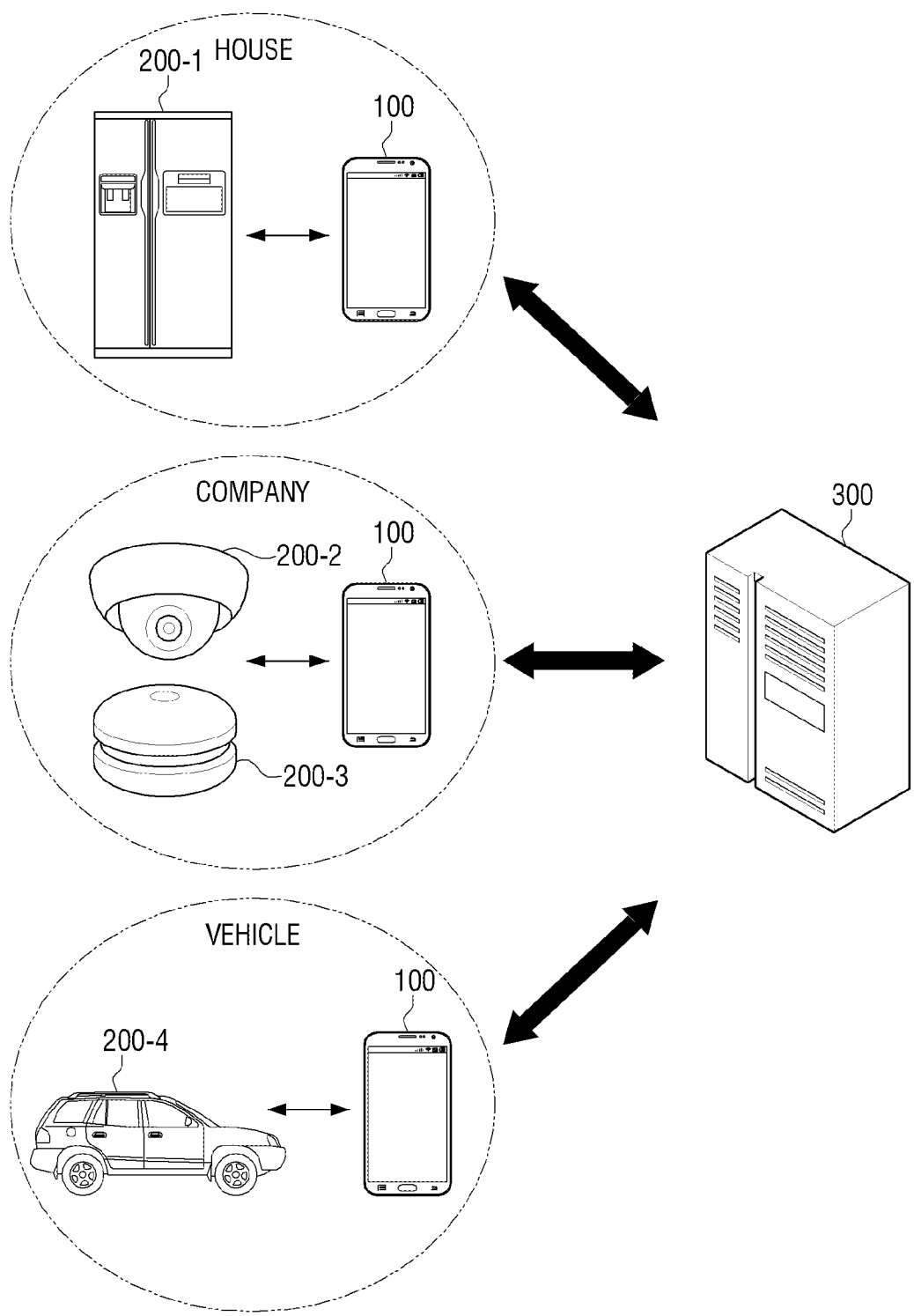
FIG. 1 is an exemplary view of a user authentication system according to an embodiment.

FIG. 1 is an exemplary view of a user authentication system according to an embodiment. As illustrated in FIG. 1, a user authentication system 10 according to an embodiment includes a mobile device 100, electronic devices 200-1 to 200-4 and a server 300.

The server 300 provides a service requiring input of user authentication information to the mobile device 100. Here, the service requiring the input of the user authentication information may be all the services requiring input of the user authentication information among services which the mobile device 100 may receive from various servers through network, and there is no restriction in types of the services.

For example, the service may be a service requiring input of an ID and a password generated through a subscription process such as an e-mail service, an online shopping service, a contents providing service, or the like, or an authentication service for authenticating the user during the use of a specific service such as a certified authentication service, self authentication service, or the like.

Hereinafter, for convenience of description, a case where the server 300 provides an authentication service will be described as an example. The mobile device 100 may be connected to the server 300 through various networks to receive an authentication service.

For example, when a user does an online shopping using the mobile device 100, authentication of the user is necessary for electronic payment in a purchase process, and at this time, the mobile device 100 may be connected to the server 300 providing an authentication service.

When the mobile device 100 is connected to the server 300, the mobile device 100 may receive and display a screen for inputting authentication information to receive user authentication information such as a name, a mobile phone number, a birth date, gender, and the like, from the server 300.

In ordinary cases, a user may input the user authentication information required for the displayed authentication information input screen to authenticate the user for proceeding the electronic payment. However, in the case of the conventional art, as described above, the user needs to input user authentication information again whenever the user makes an electronic payment, and the user may feel inconvenient.

However, according to one embodiment of the disclosure, the mobile device 100 may generate simple authentication information based on the unique information of the mobile device 100 and the unique information of the electronic devices 200-1 to 200-4, and transmit the generated simple authentication information and the user authentication information inputted through the authentication information input screen to the server 300 to register the simple authentication information.

Thereafter, when the mobile device 100 is re-connected to the server 300 for the electronic payment, the mobile device 100 may receive the user authentication without need to re-input the user authentication information, by transmitting only the simple authentication information regenerated based on the unique information of the mobile device 100 and the unique information of the electronic devices 200-1 to 200-4 to the server 300.

Specifically, when registering the simple authentication information, the server 300 matches the user authentication information received from the mobile device 100 to the simple authentication information and store the same, and therefore, if the server 300 receives only the simple authentication information from the mobile device 100, the server 300 may authenticate the user by determining whether the received simple authentication information matches the prestored simple authentication information.

For example, when the prestored simple authentication information matches the received simple authentication information, the server 300 may determine that the prestored user authentication information which is matched to the prestored simple authentication information is inputted, and transmit, to the mobile device 100, the authentication result screen notifying that the user is authenticated. If the prestored simple authentication information does not match the received simple authentication information, the authentication result screen notifying that the user is not authenticated may be transmitted.

As described above, according to an embodiment, the user may have to input the user authentication information when registering the simple authentication information, and use a service requiring input of user authentication information without inconvenience of inputting the user authentication information again after the simple authentication information is registered in the server 300.

In the meantime, according to an embodiment, the electronic devices 200-1 to 200-4 may be stationary electronic devices which are fixedly arranged at a predetermined position and used. At this time, the predetermined position where the electronic device is fixedly arranged is not limited to a fixed place, such as a house or a company, but includes a corresponding position where the electronic device can be fixedly arranged even in an object which is moving, such as a vehicle. Preferably, the predetermined position may be a private space of a user to which another person may not easily enter.

For example, as illustrated in FIG. 1, the electronic devices 200-1 to 200-4 may be a refrigerator 200-1 disposed in a house, a closed-circuit television (CCTV) 200-2 or a router 200-3 installed at a company, and an electronic system 200-4 provided in a vehicle.

In the meantime, according to an embodiment, the mobile device 100 may perform communication with the electronic devices 200-1 to 200-4 according to near-field communication and obtain unique information of the electronic devices 200-1 to 200-4 from the electronic devices 200-1 to 200-4.

Therefore, when the user is connected to the server 300 through the mobile device 100 in a house, the mobile device 100 may perform near-field communication with the refrigerator 200-1 to obtain the unique number of the refrigerator 200-1, and generate the simple authentication information based on the obtained unique information of the refrigerator 200-1 and the unique information of the mobile device 100 itself.

When the user is connected to the server 300 through the mobile device 100 at a company, the mobile device 100 may perform near-field communication with the CCTV 200-2 or the router 200-3 installed at the company to obtain the unique information, and then generate the simple authentication information.

Similarly, when the user is connected to the server 300 by boarding a vehicle, the mobile device 100 may perform near-field communication with an electronic system mounted on the vehicle, for example, a hidden navigation system to obtain unique information, and generate the simple authentication information.

In this way, when the mobile device 100 obtains the unique information through the near-field communication with the electronic devices 200-1 to 200-4 disposed in the private space of the user and registers the simple authentication information based on the unique information, even if the user loses the mobile device 100, the another person who obtains the lost mobile device 100 has to make near-field communication with a stationary electronic device disposed in a house, company, or vehicle of the user to receive a service using the simple authentication information, and therefore, it is hard for the another person who is difficult to access a private space of the user may not receive the service. Also, even when the authentication information of the user is leaked, after the simple authentication information is registered according to the embodiment, the service is provided using only the simple authentication information, and therefore, an illegal use of a service by the another person may be prevented.

In the meantime, the electronic devices 200-1 to 200-4 are not limited to the example of FIG. 1, and any stationary electronic device which may communicate with the mobile device 100 and transmit the unique information to the mobile device 100, such as an air conditioner, a washing machine, a TV, an electronic frame, a PC, a robot cleaner, or the like, may be an electronic device according to an embodiment.

Figure 2:
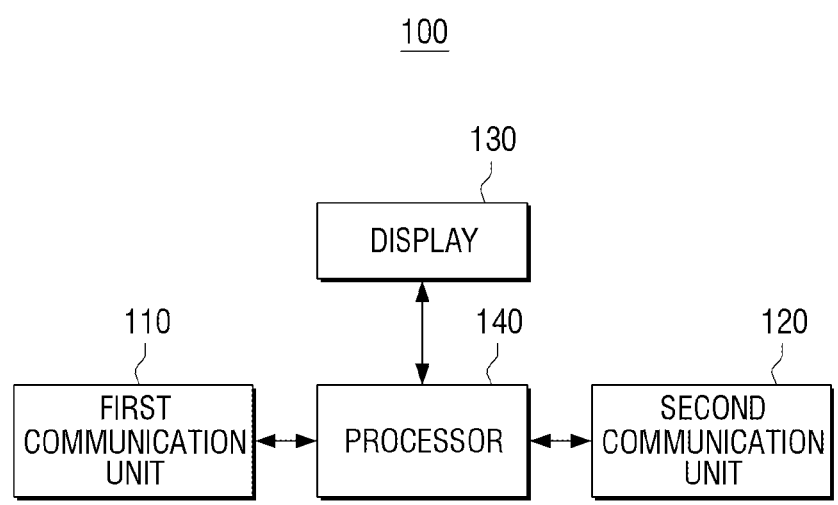
FIG. 2 is a block diagram of a mobile device according to an embodiment.

FIG. 2 is a block diagram of a mobile device according to an embodiment. Referring to FIG. 2, the mobile device 100 includes a first communication unit 110, a second communication unit 120, a display 130, and a processor 140. At this time, the mobile device 100 according to an embodiment is a portable device which may communicate with the server 300 and the electronic devices 200-1 to 200-4 through various types of wired and wireless networks, and may be implemented as various devices such as a smartphone, a tablet phone, a tablet PC, a portable multimedia player (PMP), a notebook, and the like.

The first communication unit 110 performs communication with the server 300. Specifically, the first communication unit 110 may be connected to the server 300 through various wired and wireless networks to transmit and receive information. In particular, the first communication unit 110 may be connected to the server 300 and receive a service screen which requires input of user authentication information from the server 300. Also, the first communication unit 110 may transmit the user authentication information input by the user or the simple authentication information generated by the processor 140 to the server 300.

For this purpose, the first communication unit 110 may include a wireless local area network (LAN) communication module (not shown) and a mobile communication module (not shown). The wireless LAN communication module (not shown) is a module that is connected to an external network and performs communication according to wireless communication protocols such as wireless fidelity (WiFi), institute of electrical and electronics engineers (IEEE), wireless broadband internet (WiBro), and the like. The wireless communication module is a module for performing communication by accessing a mobile communication network according to various mobile communication standards such as third generation (3G), third generation partnership project (3GPP), long term evolution (LTE), or the like.

The second communication unit 120 performs communication with the electronic device 200. In particular, the second communication unit 120 may communicate with the electronic device 200 using various communication methods to receive unique information of the electronic device. Herein, the unique information of the electronic device means unique information possessed by the electronic device that enables the electronic device to be distinguished from other electronic devices. For example, the unique information may include a medium access control (MAC) address, a serial number, a model number, and the like of the electronic device, but is not limited thereto. Any type of identification information which may be used for identification of the electronic device according to the types of the electronic device or the operating system of the electronic device may be the unique information of the electronic device. For example, if the electronic device has an Android operating system, the unique number may be the Android ID.

According to an embodiment, the second communication unit 120 may perform communication with the electronic device according to the near-field communication method and receive the unique information of the electronic device. To be specific, the second communication unit 120 may perform pairing with the electronic device according to the near-field communication method and receive the unique information from the electronic device.

For example, when the second communication unit 120 performs the pairing with the electronic devices 200-1 to 200-4 according to the Bluetooth method, the second communication unit 120 may receive the unique information of the electronic devices 200-2 to 200-4 such as the MAC address from the electronic devices 200-1 to 200-4 in the process of pairing according to the Bluetooth standard protocol. However, embodiment is not limited thereto, and according to an embodiment, the second communication unit 120 may transmit a unique information request signal, which is not a Bluetooth standard protocol, to the electronic devices 200-1 to 200-4, to receive other types of unique information during or after the pairing.

In addition, according to an embodiment, the second communication unit 120 may perform pairing with the electronic devices 200-1 to 200-4 according to the near-field communication method such as WiFi, ZigBee, ultra-wideband (UWB), or the like, and receive the unique information from the electronic devices 200-1 to 200-4 during or after the pairing according to each method.

In the meantime, the second communication unit 120 may receive the unique information from the electronic devices 200-1 to 200-4 according to the near-field communication method which does not require pairing. For example, the second communication unit 120 may obtain the unique information of the electronic devices 200-1 to 200-4 by a radio frequency identification (RFID) communication method or near-field communication (NFC) method from the RFID tag or NFC tag included in the electronic devices 200-1 to 200-4.

In the meantime, when the second communication unit 120 communicates with the electronic devices 200-1 to 200-4 by a near-field communication method requiring pairing between the devices, if the mobile device 100 is located at a position where the near-field communication with the electronic devices 200-1 to 200-4 is available, the second communication unit 120 may automatically perform pairing with the electronic devices 200-1 to 200-4 and receive the unique information of the electronic devices 200-1 to 200-4. However, the embodiment is not limited thereto, and when the mobile device 100 is positioned with a distance for performing near-field communication with the electronic devices 200-1 to 200-4, and the electronic devices 200-1 to 200-4 according to the embodiments are selected according to a user command from among the various electronic devices which are identified to be capable of communicating by the near-field communication method, the second communication unit 120 may perform pairing with the electronic devices 200-1 to 200-4 and receive the unique information.

In the meantime, when the second communication unit 120 communicates with the electronic devices 200-1 to 200-4 according to the NFC communication method or the RFID communication method not requiring pairing between the devices, if the mobile device 100 gets close to the electronic devices 200-1 to 200-4 to the extent of reading the NFC tags or the RFID tags included in the electronic devices 200-1 to 200-4, the second communication unit 120 may receive the unique information of the electronic devices 200-1 to 200-4 included in the NFC tag or the RFID tag.

For this purpose, the second communication unit 120 may include various near-field communication modules such as the Bluetooth module, Zigbee module, WiFi module, ultra wideband (UWB) module, RFID module, NFC module, or the like.

The display 130 may display various images such as a photo, a moving image, a text, a graphic, a graphical user interface (GUI) input from various sources. In particular, when the mobile device 100 is connected to the server 300, the display 130 may display various service screens provided by the server 300.

In particular, according to an embodiment, the display 130 may display an authentication information input screen for receiving an input of user authentication information received from the server 300 which provides a service requiring input of the user authentication information or an authentication result screen.

For this purpose, the display 130 may be implemented as various display technologies such as organic light emitting diodes (OLED), liquid crystal display (LCD) panel, plasma display panel (PDP), vacuum fluorescent display (VFD), field emission display (FED), electro luminescence display (ELD), or the like. Alternatively, the display 130 may be implemented as a touch screen which includes a touch panel.

The processor 140 controls overall operations of the mobile device 100. In particular, the processor 140 may generate simple information using the unique information of the mobile device and the unique information of the electronic devices 200-1 to 200-4 received through the second communication unit 120.

At this time, the unique information of the mobile device 100 is unique identification information of the mobile device 100 and may include media access control (MAC) address, a serial number, a model number, international mobile equipment identity (IMEI), mobile equipment identifier (MEID), electronic serial number (ESN), Android ID, or the like.

For example, the processor 140 may generate the simple authentication information by simply combining the unique information of the mobile device 100 and the unique information of the electronic devices 200-1 to 200-4.

In addition, the processor 140 may generate the simple authentication information by performing various encoding processes on the combined two unique information. For example, the processor 140 may generate the simple authentication information by applying the hash algorithm to the unique information of the mobile device 100 and the unique information of the electronic devices 200-1 to 200-4, but the embodiment is not limited thereto. For example, the processor 140 may generate the simple authentication information by using the technology such as Trustzone to make an execution environment by dividing the processor into a normal world and a secure world.

At this time, the unique information is unique identification information of the mobile device 100 or the electronic devices 200-1 to 200-4, and when the simple authentication information is generated using the same unique information, the processor 140 may generate the simple authentication information which is the same all the time.

The processor 140 may transmit the simple authentication information generated as shown above, and the user authentication information which is input through the authentication information input screen to the server 300 and register the simple authentication information to the server 300.

To be specific, when the mobile device 100 access the server 300 which provides a service requiring input of the user authentication information, the server 300 inputs a screen for inputting authentication information to receive an input of user authentication information. Accordingly, when the authentication information input screen is received through the first communication unit 110, the processor 140 may control the display 130 to display the received authentication information input screen.

Accordingly, when the user command for registering the simple authentication information is input, the processor 140 may generate the simple authentication information using the unique information of the mobile device 100 and the unique information of the electronic devices 200-1 to 200-4.

For example, if the authentication information input screen which is displayed on the display 130 includes a menu for registering the simple authentication information generated by the mobile device 100 to the server 300, the user may input a user command to register the simple authentication information by selecting the menu. As such, when the user command to register the simple authentication information is input, the processor 140 may generate the simple authentication information by using the unique information of the electronic devices 200-1 to 200-4 and the unique information of the mobile device 100.

At this time, the unique information of the electronic devices 200-1 to 200-4 may have already been obtained by the mobile device 100 by communicating with the electronic devices 200-1 to 200-4 through the second communication unit 120, prior to input of the user command for registering the simple authentication information, or obtained by the mobile device 100 by communicating with the electronic devices 200-1 to 200-4 through the second communication unit 120 after input of the user command for registering the simple authentication information.

As described above, when the simple authentication information is generated, and the user authentication information is input through the authentication information input screen, the processor 140 may control the first communication unit 110 to transmit the generated simple authentication information and the input user authentication information to the server 300.

For example, after the simple authentication information is generated, and then user authentication information is input, when the user command to transmit the simple authentication information and the user authentication information is input, the processor 140 may transmit the generated simple authentication information and the input user authentication information to the server 300. Therefore, whether the input of the user authentication information is made before or after the generation of the authentication information does not matter. At this time, the user command to transmit the information to the server 300 may be, for example, selecting a menu such as "confirm," "register," "transmit," or the like included in the simple authentication information input screen by a user, but is not limited thereto.

When the user authentication information and the simple authentication information are transmitted to the server 300, the server 300 may receive the information and register the simple authentication information. To be specific, the server 300 may register the simple authentication information by matching the user authentication information with simple authentication information and storing the same.

As described above, when the simple authentication information is registered to the server 300, thereafter, the user may receive a service (the service requiring input of the user authentication information) provided by the server 300 without need to input the user authentication information again. Hereinbelow, in order to distinguish the simple authentication information generated by the processor 140 when registering the simple authentication information from the simple authentication information which is generated after the registration, the simple authentication information generated at the time of registration will be referred to as the first simple authentication information, and the simple authentication information which is generated after the registration will be referred to as the second simple authentication information.

After the first simple authentication information is registered to the server 300, the processor 140 may generate the second simple authentication information using the unique information of the mobile device 100 and the unique information of the electronic devices 200-1 to 200-4. Accordingly, the processor 140 may transmit the second simple authentication information to the server 300, receive an authentication result screen from the server 300 according to whether the first simple authentication information and the second simple authentication information are matched, and display the screen, and the user may use a service provided by the server 300 without need to input the user authentication information again.

To be specific, the processor 140 may receive the unique information of the electronic devices 200-1 to 200-4 by communicating with the electronic devices 200-1 to 200-4 through the second communication unit 120 as described above, and generate the second simple authentication information using the received unique information of the electronic devices 200-1 to 200-4 and the unique information of the mobile device 100.

At this time, the first simple authentication information may be the same as the second simple authentication information. To be specific, when the unique information of the electronic devices 200-1 to 200-4 which is used for generating the simple authentication information is the same, the processor 140 may generate the same simple authentication information regardless of timing to generate the simple authentication information. Therefore, for example, when the mobile device 100 communicates with the refrigerator 200-1 at home and generates the first simple authentication information and registers the same to the server 300, then, the second simple authentication information which is generated by the mobile device 100 communicating with the refrigerator 200-1 again is the same as the first simple authentication information.

In the meantime, according to an embodiment, when the mobile device 100 and the electronic devices 200-1 to 200-4 are paired through the near-field communication method, the processor 140 may generate the second simple authentication information, and when the mobile device 100 is reconnected to the server 300, the processor 140 may control the first communication unit 110 to transmit the generated second simple authentication information to the server 300.

To be specific, when the mobile device 10 is located at a position which is capable of performing near-field communication with the electronic devices 200-1 to 200-4, the second communication unit 120, as described above, may perform pairing with the electronic devices 200-2 to 200-4 automatically or according to a user's selection. Accordingly, the processor may generate the second simple authentication information by using the unique information of the electronic devices 200-1 to 200-4 which is obtained in the process of pairing and the unique information of the mobile device 100. As described above, while the second simple authentication information is being generated, when the mobile device 100 is reconnected to the server 300, the processor 140 may control the first communication unit 110 to transmit the generated second simple authentication information to the server 300. Here, reconnection is for merely distinguishing the access of the mobile device 100 to the server 300 at the time of registering the first simple authentication information to the server 300, and does not mean that access to the server 300 by twice is necessary to transmit the second simple authentication information to the server 300.

In the meantime, according to an embodiment, there may be a case where the mobile device 100 is reconnected to the server 300, before the mobile device 100 is paired with the electronic devices 200-1 to 200-4. For example, even when the mobile device 100 is in a position which is capable of performing near-field communication with the electronic devices 200-1 to 200-4, if a user's selection command is necessary for pairing with the electronic devices 200-1 to 200-4, pairing between the mobile device 100 and the electronic devices 200-1 to 200-4 is not performed until the user selects the electronic devices 200-1 to 200-4 among the searched devices and therefore, the mobile device 100 may be reconnected to the sever 300 before the pairing between the mobile device 100 and the electronic devices 200-1 to 200-4. In this case, before the mobile device 100 is paired with the electronic devices 200-1 to 200-4 and the unique information of the electronic devices 200-1 to 200-4 is obtained, the processor 140 has no unique information of the electronic devices 200-1 to 200-4 and may not generate the second simple authentication information.

Therefore, according to another embodiment, when the mobile device 100 is reconnected to the server 300, the processor 140 may confirm whether the mobile device 100 is paired with the electronic devices 200-1 to 200-4, and when the mobile device 100 is paired with the electronic devices 200-1 to 200-4, the processor 140 may control the first communication unit 110 to generate and transmit the second simple authentication information to the server 300.

As described above, when the second simple authentication information is transmitted to the server 300, the server 300 may receive the second simple authentication information and determine whether the second simple authentication information matches the registered first simple authentication information. To be specific, when registering the simple authentication information, the server 300 matches and stores the user authentication information with the first simple authentication information, and if the first simple authentication information is identical with the second simple authentication information, it is considered that the user authentication information is input, and the authentication result screen may be provided to the mobile device 100. At this time, according to an embodiment, when the first or second simple authentication information is encoded and transmitted from the mobile device 100, the server 300 may execute a corresponding decoding process for the encoded simple authentication information which is received.

The server 300 provides a service requiring input of the user authentication information and the authentication result screen may be a screen which is provided when the user authentication information is correctly input in the service provided by the server 300. For example, in the case where the server 30 provides a service requiring log-in of a user, if the first simple authentication information and the second simple authentication information are identical, the server 300 may provide the screen in which the log-in is completed to the mobile device 100. In addition, when the server 300 is the server 300 for providing a self authentication service, if the first simple authentication information and the second simple authentication information are identical, the server 300 may provide the self authentication completion screen to the mobile device 100.

When the first simple authentication information is not identical with the second simple authentication information, the server 300 may provide the mobile device 100 with a screen which is provided when the user authentication information is not input correctly as an authentication result screen.

Accordingly, when the authentication result screen is provided from the server 300, the processor 140 may control the display 130 to display a provided authentication result screen.

According to an embodiment, when the pairing between the mobile device 100 and the electronic devices 200-1 to 200-4 is released, the processor 140 may delete the second simple authentication information.

According to an embodiment, the processor 140 may store the generated first or second simple authentication information. However, if the simple authentication information is stored for an indefinite time, in the case where the user loses the mobile device 100, another person may obtain the mobile device 100 and access the server 30 where the first simple authentication information is registered to illegally use the authentication information of the user.

In order to prevent the foregoing from occurring, when the pairing between the mobile device 100 and the electronic devices 200-1 to 200-4 is released, the processor 140 may delete the stored simple authentication information to prevent the another person's illegal use of user authentication information. At this time, the processor 140 may delete the unique information of the electronic devices 200-1 to 200-4 received from the electronic devices 200-1 to 200-4 as well, so that the simple authentication information may not be regenerated until pairing with the electronic devices 200-1 to 200-4 is done again.

However, the embodiment is not limited thereto. For example, the processor 140 may not store the generated simple authentication information, or by generating the simple authentication information to include an expiry time, make the simple authentication information deleted after a predetermined time regardless of release of pairing.

Figure 3:
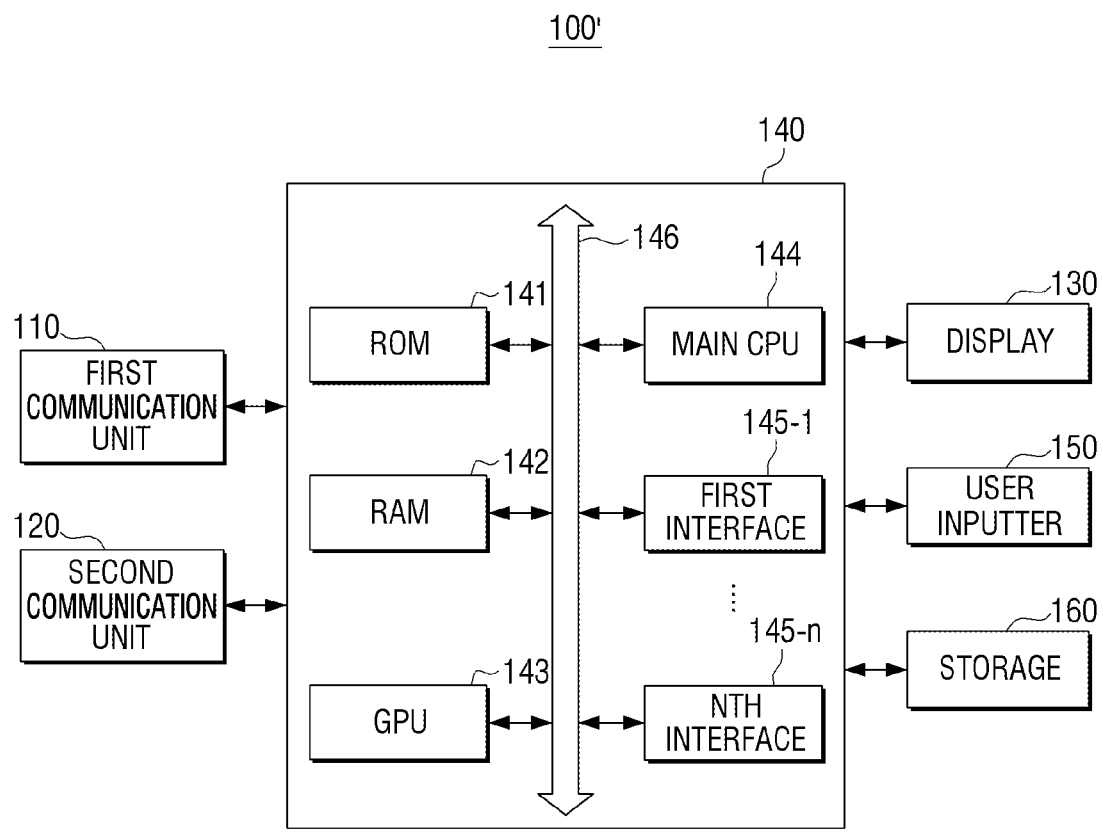
FIG. 3 is a specific block diagram of a mobile device according to an embodiment.

FIG. 3 is a specific block diagram of a mobile device according to an embodiment. According to an embodiment, a part of the configurations of FIG. 3 may be omitted or changed, and other configurations may be further added. In describing FIG. 3, the configurations overlapping with the configurations of FIG. 2 will be omitted.

Referring to FIG. 3, a mobile device 100' may include the first communication unit 110, the second communication unit 120, the display 130, the processor 140, a user inputter 150, and a storage 160. In FIGS. 2 and 3, the first communication unit 110 and the second communication unit 120 are illustrated separately, but the communication unit is divided based on functions according to one embodiment, but it is not necessary that the first and second communication units 110 and 120 are implemented as two configurations. The communication unit may have one configuration, or at least three configurations, as long as the functions of the first and second communication units 110 and 120 may be performed.

The user inputter 150 is a configuration for receiving an input of various user commands. To be specific, the user inputter 150 may receive an input of various user commands to control various information input by the user or the mobile device 100'.

In particular, the user inputter 150 may receive an input of user authentication information from the user. For example, when the mobile device 100' is connected to the server 300 and the authentication information input screen for receiving an input of the user authentication information is displayed on the display 130, the user inputter 150 may receive an input of the user authentication information from the user.

In addition, the user inputter 150 may receive an input of a user command for registering the simple authentication information. For example, when a menu for registering the simple authentication information is included in the authentication information input screen, the user may select a menu for registering the simple authentication information through the user inputter 150 and input a user command to register the simple authentication information.

In addition, according to an embodiment, the user inputter 150 may receive a user command to select the electronic devices 200-1 to 200-4 according to the embodiments, from among various electronic devices displayed in the display 130 which are identified as being communicable by the near-field communication method. In addition, the user command to transmit the user authentication information which is input by the user and the first simple authentication information generated by the processor 140 to the server 300 may be input.

For this purpose, the user inputter 150 may be implemented as various button, wheel, trackball, pointing stick, joystick, digitizer, or the like.

In addition, the user inputter 150 may be implemented as including a touch panel. For example, the user inputter 150 may be implemented as a touch screen along with the display 130, and in this case, the user may input information or a control command for controlling the mobile device 100 by touching various UI elements displayed on the touch screen.

In addition, in order to receive an input of a user command through the voice, the user inputter 150 may be configured to include a microphone. In this case, the mobile device 100 may include a voice recognition module, and the processor 140 may recognize the user's voice input through a voice recognition module using the microphone and perform a corresponding control command.

In addition, according to an embodiment, the user inputter 150 may be configured to include various motion sensors for sensing motions of a user such as a gyro sensor, an acceleration sensor, or the like. In this case, the processor 140 may detect a user motion through the motion sensor and perform a control command corresponding to the detected motion.

The storage 160 may store various data and programs. In particular, the storage 160 may store an operating system (O/S) for driving the mobile device 100', a program for operating the mobile device 100' according to various embodiments, various data which are input, set, and generated during execution of a program, contents, unique information of a mobile device, or the like.

For this purpose, the storage 160 may be implemented as a memory card (for example, a secure digital (SD) card, memory stick) which is detachable to the mobile device 100', various non-volatile memory, volatile memory, hard disk drive (HDD), or solid state drive (SSD), or the like.

The processor 130 controls overall operations of the mobile device 100'. For this purpose, the processor 140 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor.

The processor 140 may perform operation or data processing with respect to control and/or communication of at least one another configuration of the mobile device 100'.

For example, the processor 130 may include a random-access memory (RAM) 141, a read-only memory (ROM) 142, a graphics processing unit (GPU) 143, a main central processing unit (CPU) 144, a first to $n^{th}$ interface 145-1 to 145-$n$, and a bus 146.

The ROM 141, RAM 142, GPU 143, main CPU 144, the first to $n^{th}$ interface 145-1 to 145-$n$ are connected from each other through the bus 146. The first to $n^{th}$ interfaces 145-1 to 145-$n$ are connected to the various components. One of the interfaces may be a network interface connected to an external device through the network.

The main CPU 144 accesses the storage 160 and performs booting using an operating system (OS) stored in the storage 160. In addition, the CPU 144 may perform various operations using various programs, or the like, stored in the storage 160.

The ROM 141 stores a command set for booting the system and the like. When the turn-on command of the mobile device 100' is input and power is supplied, the main CPU 144 copies the OS stored in the storage 160 to the RAM 142 according to a command stored in the ROM 142, and executes the OS to boot the system. When the booting is completed, the CPU 144 copies various programs stored in the storage 160 to the RAM 142, executes the program copied to the RAM 142, and performs various operations.

The GPU 143 may generate a screen including various objects such as an icon, image, text using a calculator (not shown) and a renderer (not shown). The operator (not shown) may calculate attributes such as a color, size, shape, a coordinate value to display each object according to layouts of a screen based on the received control command, and the renderer (not shown) may generate a screen of various layouts including the object based on the attribute values calculated by the calculator (not shown).

Hereinbelow, with reference to FIGS. 4 and 5, the operations of the processor 140 according to various embodiments will be further described.

Figure 4:
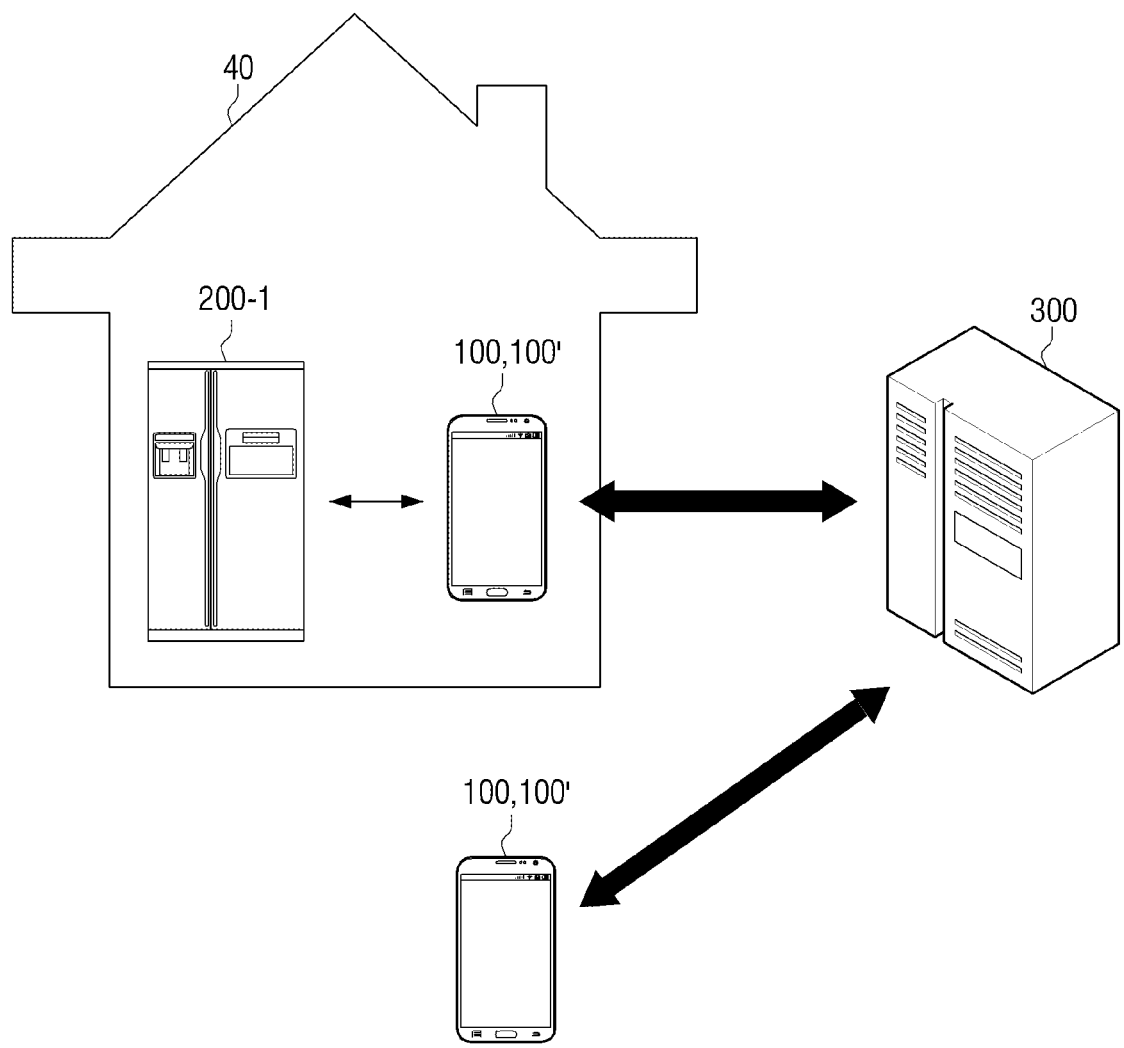
FIG. 4 is an exemplary view provided to describe an operation of a mobile device according to an embodiment.
Figure 5A:
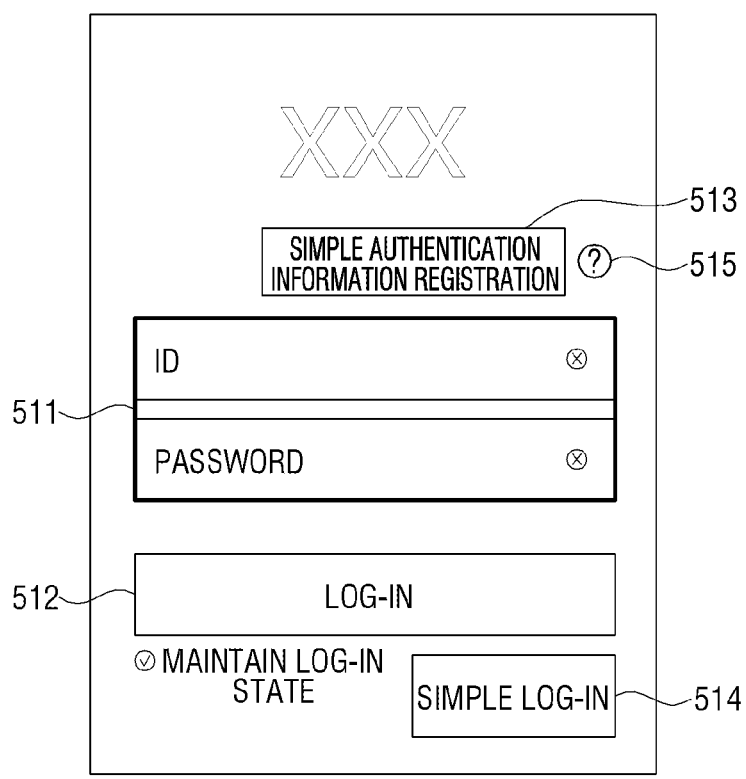
FIGS. 5A and 5B are exemplary views of an authentication information input screen according to an embodiment.
Figure 5B:
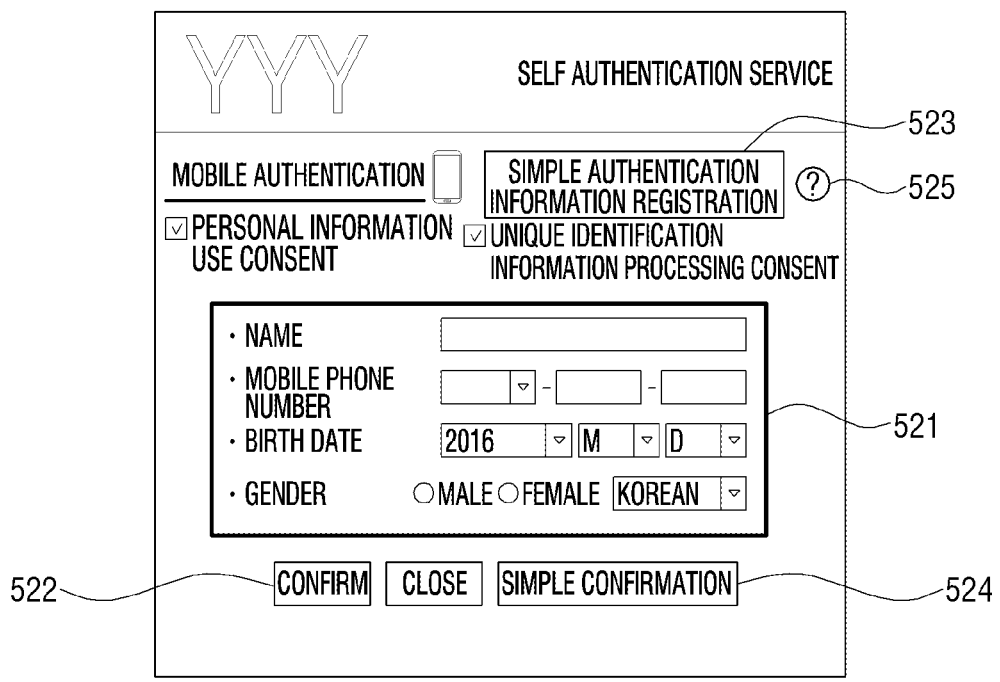

FIG. 4 is an exemplary view provided to describe an operation of a mobile device according to an embodiment, and FIGS. 5A and 5B are exemplary views of an authentication information input screen according to an embodiment.

The user may be connected to the server 300 using the mobile devices 100 or 100' and receive a service provided by the server 300. At this time, the server 300 may be a server providing a service requiring the input of user authentication information.

In the conventional art, in order for a user to use a service provided by the server 300 through the mobile devices 100 or 100', the user may feel inconvenient, as the user has to be connected to the server 300 for inputting user authentication information every time. However, according to various embodiments, the user may register the simple authentication information to the server 30 and thus may reduce such inconvenience.

To be specific, according to an embodiment, as illustrated in FIG. 4, the user may be connected to the server 300 at a house 40 of the user through the mobile device 100 or 100'. As such, when the mobile devices 100 or 100' are connected to the server 300, the processor 140 may control the display 130 to display the authentication information input screen provided by the server 300.

For example, if the service provided by the server 300 is a service requiring a login of the user, the processor 140, as shown in FIG. 5A, may control the display 130 to receive, from the server 300, the authentication information input screen for receiving an input of the log-in information of the user and display the screen. As another example, when the service provided by the server 300 is a self authentication service for authenticating the user himself or herself, the processor 140 may control the display 130 to receive the authentication information input screen for receiving information required for self authentication from the server 300 and display.

At this time, for registering the simple authentication information to the server 300, the user may select a simple authentication information registration menu 513 and 523 and input a user command for registering the simple authentication information to the mobile devices 100 or 100'.

As described above, when a user command for registering the simple authentication information is input, the processor 140 may generate the first simple authentication information. Specifically, the processor 140 may generate the first simple authentication information using the unique information of the mobile devices 100 or 100' and the unique information of the electronic devices 200-1 to 200-4. According to an embodiment, the unique information of the electronic devices 200-1 to 200-4 may be obtained by the pairing process between the second communicator 120 with the electronic devices 200-1 to 200-4 according to the near-field communication method, but the embodiment is not limited thereto.

For example, as illustrated in FIG. 4, when the mobile device 100, 100' is located in the house 40 of the user, the mobile device 100, 100' may be paired with the refrigerator 200-1, which is a stationary electronic device that is fixedly arranged and used in the house 40 of the user. Accordingly, the processor 140 may acquire the unique information of a refrigerator 200-1.

At this time, when the mobile device 100 or 100' is connected to the server 300 by the user, and a user command for registering the simple authentication information is input, the processor 140 may generate the first simple authentication information using the unique information of the refrigerator 200-1 and the unique information of the mobile device 100 or 100'.

According to an embodiment, there may be a pairing of the mobile device 100 or 100' with the refrigerator 200-1 after a user command for registering the simple authentication information. In this case, the processor 140 may generate the first simple authentication information using the unique information of the refrigerator 200-1 and the unique information of the mobile device 100 or 100' obtained in the pairing process.

Also, according to the embodiment, when the unique information of the refrigerator 200-1 is included in the NFC tag attached to the refrigerator 200-1, after the user inputs a user command for registering the simple authentication information, the user may obtain the unique information of the refrigerator 200-1 by tagging the mobile device 100 or 100' to the refrigerator 200-1, and generate the first simple authentication information using the obtained unique information of the refrigerator 200-1 and the information of the mobile device 100 or 100'.

Meanwhile, the user may input the user authentication information through the authentication information input screen in order to register the first simple authentication information to the server 300. Specifically, the user may input user authentication information requiring input in an authentication information input fields 511 and 521 of the authentication information input screen through the user inputter 150. For example, as illustrated in FIG. 5A, the user may input login information such as an ID and a password, or information required for self authentication such as a name, a mobile phone number, a date of birth, a gender, and nationality as illustrated in FIG. 5B.

Thereafter, when the user command to transmit the generated first simple authentication information and the input user authentication information is input, the processor 140 may control the first communication unit 110 to transmit the first simple authentication information and the user authentication information to the server 300. For example, while the user authentication information is being input, and the first simple authentication information is being generated, if the user selects a log-in menu 512 of FIG. 5A or a confirmation menu 522 of FIG. 5B, the processor 140 may control the first communication unit 110 to transmit the input user authentication information and the generated first simple authentication information to the server 300. In the meantime, according to an embodiment, after the user authentication information and the first simple authentication information are transmitted to the server 300, the processor 140 may delete the user authentication information or the first simple authentication information from the mobile device 100 or 100'.

Accordingly, when the user authentication information and the first simple authentication information are received, the server 300 may register the first simple authentication information by matching the first simple authentication information to the user authentication information and storing the same.

Thereafter, when the mobile device 100 or 100' is connected to the server 300 again, the processor 140 may control the display 130 to display the authentication information input screen provided by the server 300 as illustrated in FIGS. 5A and 5B.

In addition, the processor 140 may control the second communicator 120 to receive the unique information of the refrigerator 200-1 from the refrigerator 200-1 by communicating with the 200-1 through various methods. Accordingly, the processor 140 may generate the second simple authentication information using the unique information of the mobile device 100 or 100' and the unique information of the refrigerator 200-1.

As described above, when the mobile device 100 or 100' is reconnected to the server and the second simple authentication information is generated, the processor 140 may control the first communication unit 110 to transmit the second simple authentication information to the server 300. At this time, whether reconnection of the mobile device 100 or 100' to the server is before or after the generation of the second simple authentication information does not matter.

Meanwhile, according to one embodiment, after the mobile device 100 or 100' is reconnected to the server and the second simple authentication information is generated, when the simple authentication menus 514 and 524 included in the authentication information input screen displayed on the display 130 are selected by the user, the processor 140 may control the first communication unit 110 to transmit the second simple authentication information to the server 300. That is, in the examples of FIGS. 5A and 5B, while the mobile device 100 or 100' is reconnected to the server and the second simple authentication information is generated, if the simple login menu 514 or the simple confirmation menu 524 is selected by the user, the processor 140 may control the first communication unit 110 to transmit the second simple authentication information to the server 300.

However, according to an embodiment, when the mobile device 100 or 100' is reconnected to the server and the second simple authentication information is generated, the processor 140 may control the first communication unit 110 to automatically transmit the second simple authentication information to the server 300. In this case, even if the mobile device 100 or 100' is reconnected to the server 300, the processor 140 may control the display 130 to directly display the authentication result screen provided by the server 300, without displaying the authentication information input screen as FIGS. 5A and 5B.

The process after transmitting the second simple authentication information to the server 300 is as described in FIG. 2.

According to an embodiment, the processor 140 may control the second communication unit 120 to perform communication with the refrigerator 200-1 according to a near-field communication method. In the example of FIG. 4, when the mobile device 100 or 100' is located in the user's house 40, the distance between the mobile device 100 or 100' and the refrigerator 200-1 is short enough to perform near-field communication. Therefore, the mobile device 100 or 100' may be paired with the refrigerator 200-1, and accordingly, the processor 140 may obtain the unique number of the refrigerator 200-1 and generate the second simple authentication information.

In contrast, in the example of FIG. 4, if the mobile device 100 or 100' is outside the house 40, the mobile device 100 or 100' and the refrigerator 200-1 may not be paired through the near-field communication and thus, the processor 140 may not obtain the unique number of the refrigerator 200-1 and may not generate the second simple authentication information finally. Therefore, if the user loses the mobile device 100 or 100' and another person obtains the mobile device and is connected to the server 300, unless the another person trespasses the house 40 of the user, the mobile device 100 or 100' and the refrigerator 200-1 in the house 40 of the user may not be paired. Therefore, the second simple authentication information may not be generated. Accordingly, the another person may not illegally use the authentication information of the user.

In addition, as described above, when pairing of the mobile device 100 or 100' and the refrigerator 200-1 is released, the processor 140 may delete the second simple authentication information, and the another person may not use the second simple authentication information stored in the mobile device 100 or 100'.

In the meantime, according to an embodiment, the authentication information input screen may include the simple authentication service description menus 515, 525 for providing descriptions of a method for registering and using the simple authentication information as illustrated in FIGS. 5A and 5B. Therefore, the user may select the simple authentication service description menus 515, 525 through the user inputter 150 and receive descriptions of a method for registering and using the simple authentication information.

As described above, it has been described that the user of the mobile device 100 or 100' uses the simple authentication service using the refrigerator 200-1 at the house 40 of the user, but as illustrated in FIG. 1, the user may use the simple authentication information service using a stationary electronic device which is arranged and used at other places, such as the CCTV 200-2 of a company and an electronic system 200-4 of a vehicle.

Figure 6:
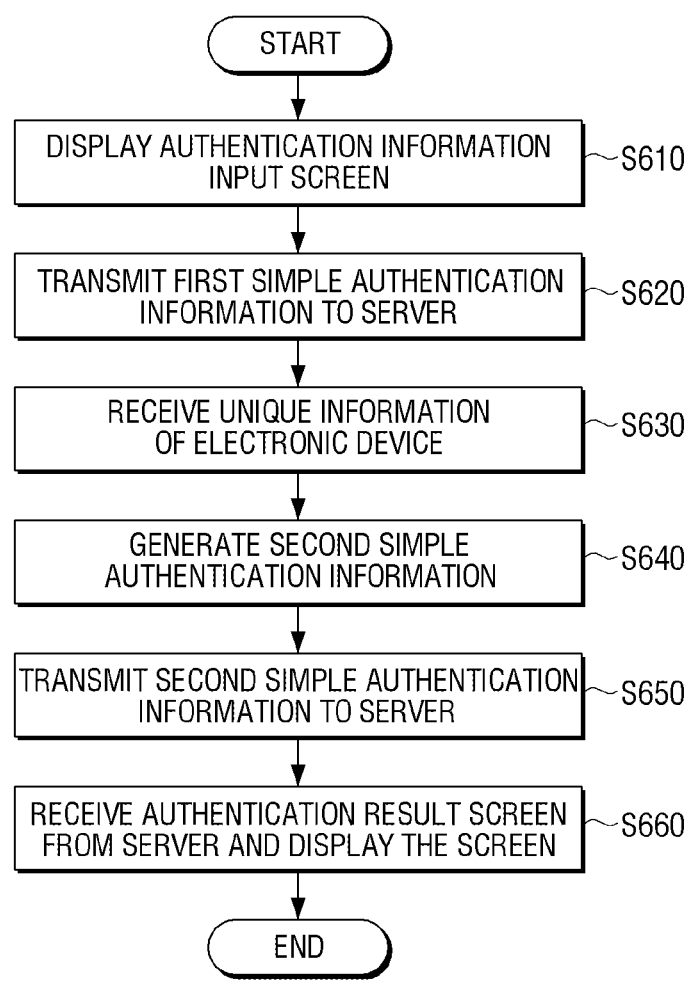
FIG. 6 is a flowchart of a user authentication method of a mobile device according to an embodiment.

According to FIG. 6, when the mobile device 100 or 100' is connected to the server 300 providing a service requiring input of the user authentication information, the mobile device 100 or 100' may display an authentication information input screen for receiving the user authentication information in step S610.

Accordingly, the mobile device 100 or 100' may transmit, to the server, the user authentication information inputted through the authentication information input screen and the first simple authentication information generated in the mobile device 100 or 100' in step S620. To be specific, the mobile device 100 or 100' may receive the unique information of the electronic device from an external electronic device, and when a user command for registering the simple authentication information is input, generate the first simple authentication information using the unique information of the mobile device 100 or 100' and the unique information of the electronic device, and then transmit the user authentication information inputted through the authentication information input screen and the first simple authentication information to the server 300.

At this time, when the user authentication information and the first simple authentication information are received from the mobile device 100 or 100', the server 300 may match the first simple authentication information to the user authentication information and store the same.

As described above, after the first simple authentication information is registered, the mobile device 100 or 100' may communicate with the electronic device and receive the unique information of the electronic device in step S630. For example, in the process of pairing with the electronic device according to the near-field communication method, the mobile device 100 or 100' may receive the unique information of the electronic device. At this time, the electronic device may be a stationary electronic device which is fixedly arranged at a predetermined position and used.

Accordingly, the mobile device 100 or 100' may generate the second simple authentication information using the unique information of the mobile device and the unique information of the electronic device in step S640, and transmit the second simple authentication information to the server 300 which matches the first simple authentication information to the user authentication information and stores the same in step S650.

According to an embodiment, when the mobile device 100 or 100' and the electronic device are paired, the mobile device 100 or 100' may generate the second simple authentication information, and when the mobile device 100 or 100' is reconnected to the server 300, the mobile device 100 or 100' may transmit the second simple authentication information to the server 300.

According to another embodiment, when the mobile device 100 or 100' is reconnected to the server 300, the mobile device 100 or 100' may confirm pairing state of the mobile device 100 or 100' with the electronic device, and when the mobile device 100 or 100' is paired with the electronic device, the mobile device 100 or 100' may generate the second simple authentication information and then transmit the second simple authentication information to the server 300.

At this time, according to an embodiment, the mobile device 100 or 100', when pairing between the mobile device 100 or 100' and the electronic device is released, the mobile device 100 or 100' may delete the second simple authentication information.

Accordingly, the mobile device 100 or 100' may receive an authentication result screen from the server 300 according to whether the first and second simple authentication information is matched to each other, and display the same.

Figure 7:
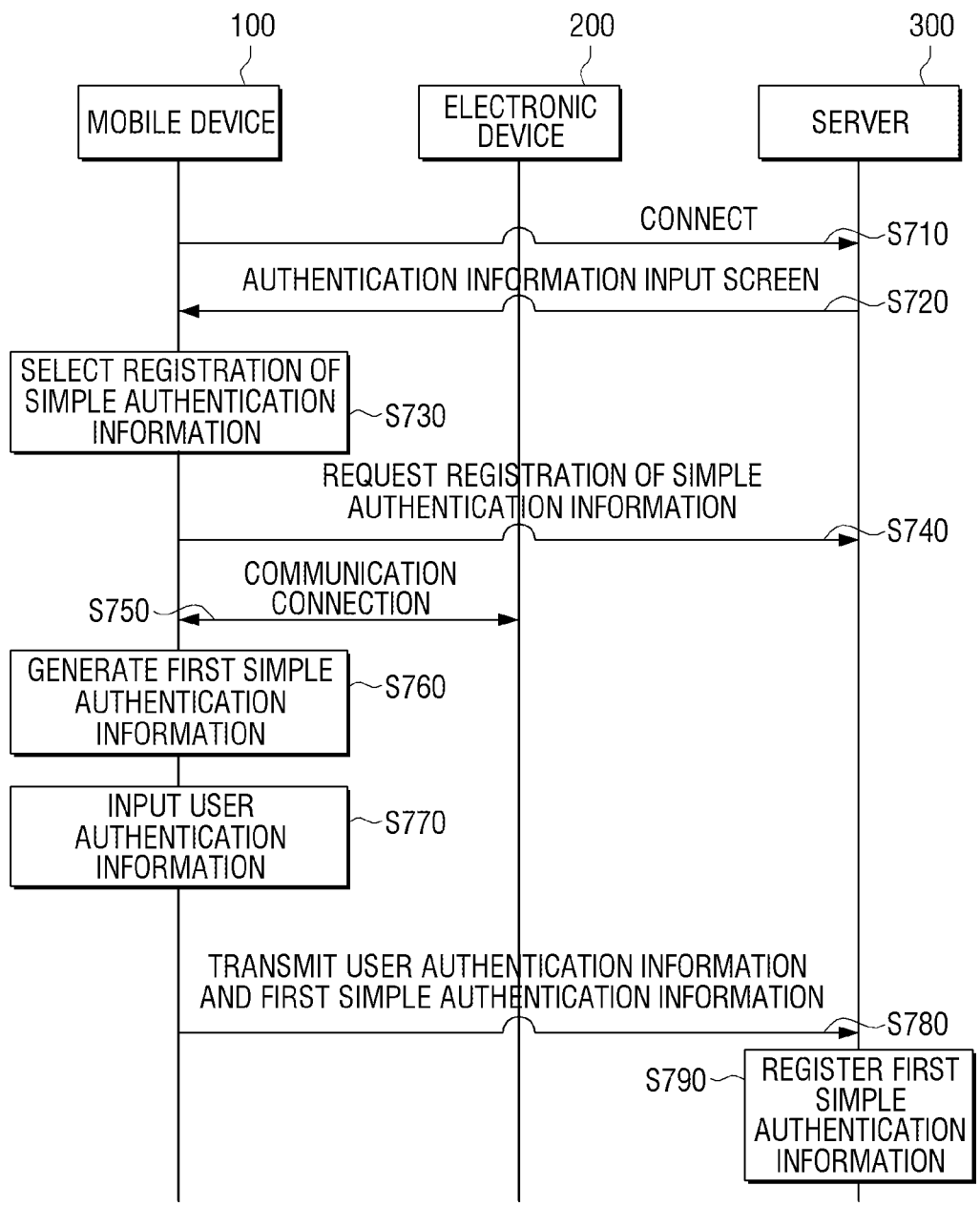
FIG. 7 is a procedure map illustrating a process for registering simple authentication information of a mobile device in a user authentication system according to an embodiment.

FIG. 7 is a procedure map illustrating a process for registering simple authentication information of a mobile device in a user authentication system according to an embodiment. As illustrated in FIG. 7, when the mobile device 100 is connected to the server 300 in step S710, the server 300 providing a service requiring input of the user authentication information provides the authentication information input screen for receiving the user authentication information to the mobile device in step S720. Accordingly, the mobile device 100 displays the authentication information input screen.

When the simple authentication information registration menu included in the authentication information input screen is selected by the user in step S730, the mobile device 100 request registration of the simple authentication information to the server 300 in step S740, and communicates with the electronic device 20 in step S750. At this time, according to an embodiment, the electronic device 200 may be a stationary electronic device which is fixedly arranged at a predetermined position and used, but is not limited thereto.

To be specific, the mobile device 100 may be connected to the electronic device 200 by performing pairing according to the near-field communication method, and obtain the unique information from the electronic device 200 during or after the pairing. Accordingly, the mobile device 100 may generate the first simple authentication information using the unique information of the mobile device and the unique information of the electronic device 200 in step S760.

In the meantime, when the user authentication information is inputted through the authentication information input screen in step S770, and the menu for transmitting the user authentication information and the first simple authentication information to the server 300 is selected through the authentication information input screen, the mobile device 100 may transmit the user authentication information and the first simple authentication information to the server 300 in step S780. At this time, according to an embodiment, the user authentication information may be inputted prior to the generation of the first simple authentication information.

When the user authentication information and the first simple authentication information are received, the server 300 may register the first simple authentication information by matching the first simple authentication information to the user authentication information and storing the same in step S790.

FIG. 8 is a procedure map illustrating a user authentication method of a mobile device in a user authentication system according to an embodiment. FIG. 8 has an assumption that the first simple authentication information is registered in the server 300 as described in FIG. 7.

According to FIG. 8, the user may be reconnected to the server 300 for using a service provided by the server 300 in step S810. Accordingly, the server 300 may provide the authentication information input screen to the mobile device 100 in step S820, and the mobile device 100 may display the provided authentication information input screen.

The mobile device 100 may perform communication connection with the electronic device 200 in step S830 to obtain the unique information of the electronic device 200 from the electronic device 200, and then generate the second simple authentication information using the unique information of the mobile device 100 and the unique information of the electronic device 200 in step S840.

Accordingly, when the menu (for example, simple login menu) for transmitting the second simple authentication information included in the authentication information input screen is selected in step S850, the mobile device 100 may transmit the second simple authentication information to the server 300 in step S860.

When the second simple authentication information is received, the server 300 may determine whether the pre-stored first simple authentication information is matched to the received second simple authentication information in step S870, and provide the authentication result screen to the mobile device 100 according to the matching result in step S880. Accordingly, the mobile device 100 may display the authentication result screen provided from the server 300 in step S890.

At this time, when the unique information is the same, the mobile device 100 generates the same simple authentication information all the time (in the embodiment where the expiry time is included in the simple authentication information, the expiry time may be generated differently) and thus, if the electronic device 200 of FIG. 7 is same as the electronic device 200 of FIG. 8, the first simple authentication information is the same as the second simple authentication information. In this case, the server 300, when the user authentication information is inputted correctly, may provide the service screen provided by the server 300 to the mobile device 100 as the authentication result screen.

If the first simple authentication information is not the same as the second simple authentication information, the server 300 may provide a screen which is provided when the user authentication information is not inputted correctly (for example, a service screen which is provided when the ID and password are not inputted correctly, or the self authentication information is not inputted correctly) to the mobile device 10 as the authentication result screen.

In the meantime, according to an embodiment, in an embodiment where, when the mobile device 10 is reconnected to the server 300 and the second simple authentication information is generated, the second simple authentication information is automatically transmitted to the server 300, unlike FIG. 8, even when the mobile device 100 is reconnected to the server 300, the server 300 may not provide the authentication information input screen to the mobile device 100 and directly provide the authentication result screen to the mobile device 100 according to the result of matching of the first simple authentication information and the second simple authentication information.

According to the various embodiments as described above, inconvenience of a user due to input authentication information every time when using a service requiring input of the authentication information would be solved, and even when the user loses the device or authentication information of the user is exposed, illegal use of another person may be prevented.

An operation of the processor 140 of the mobile device 100 or 100' according to the various embodiments or a user authentication method of the mobile device 100 or 100' may be generated as software and included in the mobile device 100 or 100'. In addition, the operation of the server 300 in the user authentication system may be generated as the software as well and included in the server 300.

For example a non-transitory computer readable medium storing a program which executes a user authentication method of the mobile device 100 or 100' which includes the steps of, when the mobile device 100 or 100' providing a service requiring the input of the user authentication information is connected to the server 300, displaying an authentication information input screen for receiving the user authentication information, transmitting, to the server 300, the user authentication information which is inputted through the authentication information input screen and the first simple authentication information generated in the mobile device 100 or 100', receiving the unique information of the electronic devices 200-1 to 200-4 by communicating with the electronic devices 200-1 to 200-4, generating the second simple authentication information using the unique information of the mobile device 100 or 100' and the unique information of the electronic devices 200-1 to 200-4, transmitting the second simple authentication information to the server 300 which matches the first simple authentication information to the user authentication information and stores the same, and displaying the received authentication result screen from the server 300 according to a matching state of the first simple authentication information and the second simple authentication information may be installed in the mobile device 100 or 100'.

The non-transitory computer readable medium refers to a medium that stores data semi-permanently rather than storing data for a very short time, such as a register, a cache, a memory or etc., and is readable by an apparatus. In detail, the aforementioned various middleware or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The above description is merely illustrative of the technical idea of the disclosure, and it will be understood by those of ordinary skill in the art that various changes in form and details may be made therein without departing from the spirit and scope of the disclosure. In addition, the embodiments disclosed herein are not intended to limit the scope of the disclosure but to describe the technical spirit of the disclosure, and the scope of the technical spirit of the disclosure is not limited by the embodiments. Therefore, the scope of the disclosure is to be construed according to the following claims, and all the technical spirits within the equivalent scope is within the scope of the appended claims.

What is claimed is:

1. A mobile device communicating with a server providing a service requiring input of user authentication information, the mobile device comprising:
   a display for, based on the mobile device being connected to the server, displaying an authentication information input screen for receiving the user authentication information;
   a first communication interface configured to transmit, to the server, user authentication information input through the authentication information input screen and first simple authentication information generated in the mobile device;
   a second communication interface configured to receive unique information of an electronic device by communicating with the electronic device; and
   a processor configured to:

generate second simple authentication information by using unique information of the mobile device and the unique information of the electronic device, transmit the second simple authentication information to the server which stores the first simple authentication information and the user authentication information which are matched with each other, and control the display to display an authentication result screen provided from the server according to whether the first and the second simple authentication information are same, wherein the authentication result screen comprises, based on the first simple authentication information and the second simple authentication information being same, information indicating that a user corresponding to the user authentication information matched with the first simple authentication information is authenticated, and wherein the processor is further configured to:
based on a user command for registering simple authentication information being input, generate the first simple authentication information using the unique information of the mobile device and the unique information of the electronic device, and control the first communication interface to transmit the user authentication information and the first simple authentication information to the server.

2. The mobile device of claim 1, wherein the server, based on the user authentication information and the first simple authentication information being received from the mobile device, matches the first simple authentication information and the user authentication information and stores the matched first simple authentication information and user authentication information.

3. The mobile device of claim 1, wherein the second communication interface performs pairing with the electronic device according to a near-field communication method, and
wherein the processor obtains the unique information of the electronic device in the pairing process.

4. The mobile device of claim 3, wherein the processor is configured to:
based on the mobile device being paired with the electronic device, generate the second simple authentication information, and based on the mobile device being reconnected to the server, control the first communication interface to transmit the second simple authentication information to the server.

5. The mobile device of claim 3, wherein the processor is configured to:
based on the mobile device being reconnected to the server, confirm whether the mobile device is paired with the electronic device,
based on the mobile device and the electronic device being paired, generate the second simple authentication information, and
control the first communication interface to transmit the second simple authentication information to the server.

6. The mobile device of claim 3, wherein the processor, based on pairing of the mobile device and the electronic device being released, deletes the second simple authentication information.

7. The mobile device of claim 1, wherein the electronic device is a stationary electronic device which is fixedly arranged on a predetermined position and used.

8. The mobile device of claim 1, wherein the user authentication information and the first simple authentication information are associated with each other.

9. The mobile device of claim 1, wherein the user authentication information, the unique information of the mobile device and the unique information of the electronic device are associated with each other.

10. A user authentication method of a mobile device, the method comprising:
based on the mobile device being connected to a server providing a service requiring input of user authentication information, displaying an authentication information input screen for receiving the user authentication information;
transmitting, to the server, user authentication information input through the authentication information input screen and first simple authentication information generated in the mobile device;
receiving unique information of an electronic device by communicating with the electronic device;
generating second simple authentication information by using unique information of the mobile device and the unique information of the electronic device;
transmitting the second simple authentication information to the server which stores the first simple authentication information and the user authentication information which are matched with each other; and
displaying an authentication result screen provided from the server according to whether the first and the second simple authentication information are same,
wherein the authentication result screen comprises, based on the first simple authentication information and the second simple authentication information being same, information indicating that a user corresponding to the user authentication information matched with the first simple authentication information is authenticated,
wherein the transmitting the first simple authentication information to the server comprises:
receiving the unique information of the electronic device from the electronic device;
based on a user command for registering simple authentication information being input, generating the first simple authentication information by using the unique information of the mobile device and the unique information of the electronic device; and
transmitting the user authentication information and the first simple authentication information to the server.

11. The method of claim 10, wherein the server, based on the user authentication information and the first simple authentication information being received from the mobile device, matches the first simple authentication information and the user authentication information and stores the matched first simple authentication information and user authentication information.

12. The method of claim 10, wherein the receiving the unique information of the electronic device comprises receiving unique information of the electronic device in a process of pairing with the electronic device according to a near-field communication method.

13. The method of claim 12, wherein the generating the second simple authentication information comprises, based on the mobile device being paired with the electronic device, generating the second simple authentication information, and
wherein the transmitting the second simple authentication information comprises, based on the mobile device being reconnected to the server, transmitting the second simple authentication information to the server.

14. The method of claim 12, wherein the generating the second simple authentication information comprises:

based on the mobile device being reconnected to the server, confirming whether the mobile device is paired with the electronic device; and based on the mobile device and the electronic device being paired, generating the second simple authentication information.

15. The method of claim 12, comprising:

based on pairing of the mobile device and the electronic device being released, deleting the second simple authentication information.

16. The method of claim 10, wherein the user authentication information and the first simple authentication information are associated with each other.

17. The method of claim 10, wherein the user authentication information, the unique information of the mobile device and the unique information of the electronic device are associated with each other.

18. A server communicating with a mobile device, the server comprising:

a memory storing one or more instructions; and a processor configured to execute the one or more instructions to:

receive user authentication information input through an authentication information input screen of the mobile device and first simple authentication information generated in the mobile device, the first simple authentication information generated based on unique information of the mobile device and unique information of an electronic device in a vicinity of the mobile device;

store the user authentication information and the first simple authentication information in association with each other;

receive second simple authentication information from the mobile device;

perform authentication based on a match between the first simple authentication information and the second simple authentication information; and providing an authentication result screen to the mobile device based on the authentication, wherein the authentication result screen comprises, based on the first simple authentication information and the second simple authentication information being same, information indicating that a user corresponding to the user authentication information matched with the first simple authentication information is authenticated, and wherein the first simple authentication information is generated using the unique information of the mobile device and the unique information of the electronic device, based on a user command for registering simple authentication information.

* * * * *